United States Patent
Elliott

[15] 3,658,424
[45] Apr. 25, 1972

[54] METHOD OF FOCUSING THE HORIZONTAL AND VERTICAL COMPONENTS FROM AN ECHELLE GRATING

[72] Inventor: William G. Elliott, Lincoln, Mass.
[73] Assignee: Spectra Metrics, Incorporated, Burlington, Mass.
[22] Filed: Jan. 14, 1971
[21] Appl. No.: 106,500

Related U.S. Application Data

[60] Division of Ser. No. 710,881, Mar. 6, 1968, abandoned, Continuation of Ser. No. 106,561, Jan. 14, 1971.

[52] U.S. Cl. .............................356/98, 350/162 R, 356/51, 356/79, 356/100
[51] Int. Cl. ........................G01j 3/14, G01j 3/18, G01j 3/02
[58] Field of Search..............350/162 R; 356/51, 74, 76–79, 356/96–101

[56] References Cited

UNITED STATES PATENTS 2,650,307  8/1953  Koppius...........................356/83 X
2,671,128  3/1954  Zworykin et al..................356/83 X

OTHER PUBLICATIONS

Mark: The Review of Scientific Instruments, Vol. 15, No. 2, February 1944, pages 28– 36
Tolanksy: High Resolution Spectroscopy, Pitman Publishing Corporation, 1947, pages 231– 237
Harrison: Journal of the Optical Society of America, Vol. 39, No. 7, July 1949, pages 522– 528
Harrison et al: Journal of the Optical Society of America, Vol. 42, No. 10, Oct. 1952, pages 706– 712
Bausch & Lamb Catalog D-260, Echelle Spectrographs, pages 1– 24, received U.S. Patent Office Aug. 19, 1955
Tarasov: Optics and Spectroscopy, Vol. 11, No. 5– 6, Nov.-Dec. 1961, pages 368 and 369

Primary Examiner—Ronald L. Wibert
Assistant Examiner—F. L. Evans
Attorney—Richard P. Crowley and Richard L. Stevens

[57] ABSTRACT

A method for focusing the horizontal and vertical components of energy reflected from an echelle grating which includes rotating the grating about a first axis substantially parallel to a prism face and rotating the grating about a second axis substantially normal to the first axis.

7 Claims, 4 Drawing Figures

METHOD OF FOCUSING THE HORIZONTAL AND VERTICAL COMPONENTS FROM AN ECHELLE GRATING

PRIOR COPENDING APPLICATION

This application is a divisional of my earlier filed application Ser. No. 710,881, filed Mar. 6, 1968, and entitled "ECHELLE SPECTROMETER", now abandoned, and continuing application Ser. No. 106,561, filed Jan. 14, 1971.

BACKGROUND OF THE INVENTION

Spectrometers are devices employed for measuring the spectral energy distribution impinging on its entrance aperture. In general, there are two types; the dispersive type which causes energy to be concentrated in space as a unique function of wavelength, and the interferometer type which produces interference patterns distributed in space as a function of wavelength. The dispersive type must be used in any situation where it is necessary to isolate a particular wavelength interval, i.e., in experiments which depend upon the energy per photon of impinging energy. Two methods are conventionally used to provide the dispersion; a prism or a grating. Operation of the former method depends upon the variation of photon velocity as a function of the energy per photon hence it is highly dependent upon appropriate materials being available. The latter method utilizes interference between wavelets reflected from various portions of a ruled surface. Because constructive interference can occur for any integral number of waves between adjacent grooves on the grating, spatial separation as a function of wavelength is not unique. Hence it is necessary to employ some form of "order sorting" method used in conjunction with the grating.

Because the mechanical variability in the groove spacing and angle is usually associated with the fabrication of such grating, it has not been possible to use such gratings under conditions in which the wavelength being measured is in the visible region of the spectrum and where the number of wavelength differences between adjacent grooves is large. An exception to this is the use of a so-called echelle grating for far infrared spectroscopy where the groove dimensions are sufficiently large that adequate tolerance can be obtained using machine tools in their manufacture. Recently, however, new techniques for controlling the ruling of gratings have made it possible to produce gratings with adequate precision to be used in high orders in the visible and ultraviolet region of the spectrum. Spectrometers employing such gratings have been investigated and constructed and instruments are available which use a combination of two spectrometers in series, one of which is used to select the order of the other. The majority of these instruments however, operate only under a small wavelength interval at any given setting. This is because conventional gratings capable of yielding high resolution also produced an angular spread too large to be collected and focused conveniently.

A novel spectrometer employing an echelle grating has now been found which is not subject to the deficiencies of the prior art.

SUMMARY OF THE INVENTION

The novel spectrometer of the present invention is comprised of the following essential components:
- an entrance aperture
- at least a first collimating mirror
- a prism
- an echelled grating
- at least a first exit focal plane.

The grating is mounted in the spectrometer so that it rotates in two directions: (1) around an axis parallel to the prism mounting axis parallel to the prism face, and (2) around an axis parallel to the grating rulings and thus perpendicular to the first grating mounting shaft, thus providing means for adjusting the vertical and horizontal components of the dispersed energy in the focal plane.

By means of the aforementioned grating rotational abilities, the horizontal and vertical components of the dispersed energy in the exit focal plane can be adjusted independently, thereby providing greater resolution and order spacing than has heretofore been possible.

The prism is rotatable around a horizontal axis which passes through the central ray of the incident beam and parallel to the first surface of the prism, i.e., the face of which the incident beam falls. By pivoting the prism, the angle between the incident energy and the prism face can be adjusted without appreciably altering the location of the incident beam on the prism face. Permitting only a single degree of rotational freedom in the prism ensures that the dispersion of the prism is not inadvertantly added to the dispersion of the grating. Preferably, the face of the prism most distant from the grating is nondispersive, which obviates the necessity of moving the collimating mirrors.

While the configuration of the entrance aperture is not critical, it is preferred that the length is five to ten times the width.

The superior resolution available with the novel spectrometer of the present invention can be illustrated with reference to the "Iron Triplet." The industry employs a rule of thumb indication of acceptability of a spectrometer by referring to the so-called "Iron Triplet," i.e., a series of lines at 3020 A. An instrument is considered satisfactory if three lines can be distinguished on a spectrograph with low power magnification. By means of the high degree of resolution obtainable with the novel device of the present invention, spectrographs are obtainable which show not only the three lines of the "Iron Triplet" but actually five lines, and which can be viewed without magnification.

By proper choice of prism geometry and material combined with a echelle grating having an appropriate number of grooves and groove spacing, a resolving power of 250,000 can be readily obtained throughout the spectral region from 1200 A to 0.50 microns.

DESCRIPTION OF THE PREFERRED EMBODIMENTS

Figure 1:
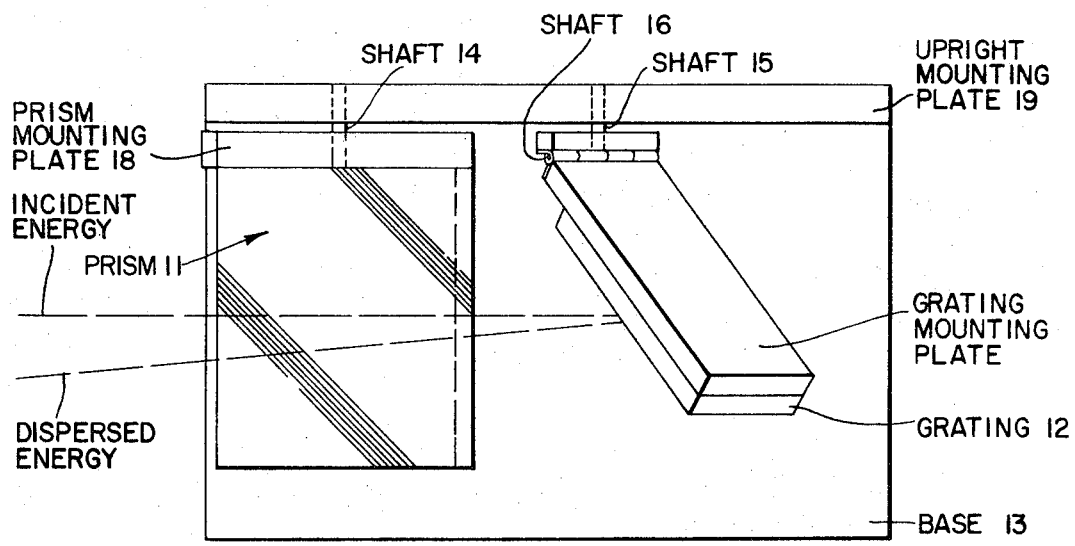
FIG. 1 is an illustration in diagrammatical form of a plan view of the novel spectrometer of the present invention showing the arrangement of the prism with respect to the grating.
Figure 2:
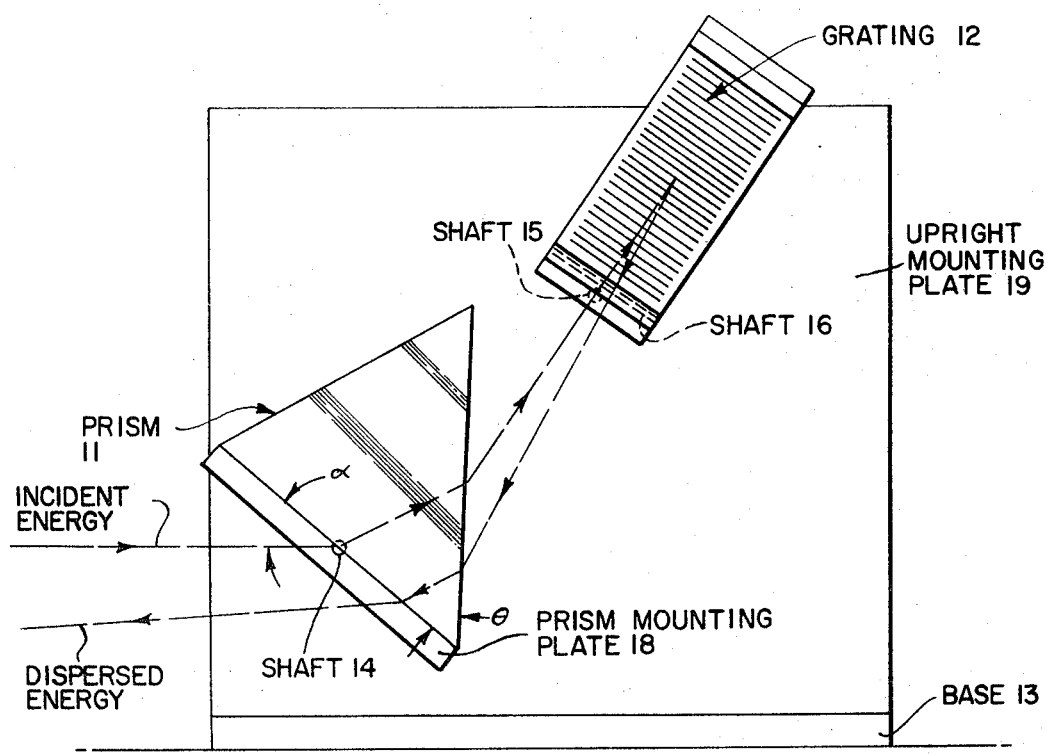
FIG. 2 is an elevation view of the components of FIG. 1.

Referring now to the drawings in FIGS. 1 and 2, there is shown in diagrammatic form the relationship of the prism to the echelle grating and the mounting and relative axes of rotation of said prism and grating. Incident energy from a source (not shown) impinges upon prism 11 which is mounted on a prism mounting plate 18 and which rotates on shaft 14. The incident energy passes through prism 11 and is dispersed along a first coordinate extending in the direction of the length of the slit. The thus-dispersed incident energy from the prism 11 is incident on echelle grating 12 which is mounted on grating mounting plate 17 with shaft 16 parallel to the rulings on said grating 12 and wherein said grating mounting plate is connected to shaft 15 which is perpendicular to shaft 16 and parallel to prism shaft 14. Shaft 14 is fastened to upright mounting plate 19 which is secured at a right angle to base 13. The reflected energy from the echelle grating 13 now passes back through prism 11 where it is further dispersed and directed toward an output collimator (not shown). The arrangement of the prism and grating as shown in FIGS. 1 and 2 provides the maximum dispersion by both the prism and the echelle grating while at the same time permitting a reasonable size for both the prism and grating and also maintaining a compact beam which enables the instrument to be a relatively small size as compared with prior art commercial devices.

As shown in FIGS. 1 and 2 the prism and grating are supported by a vertical mounting plate which in turn is supported by a base plate. The bearings for the shaft are mounted upright in the vertical mounting plate. In an alternative embodiment, the base plate may be mounted in the instrument frame by a shaft which rotates about a vertical axis passing through the intersection of the central ray of the incident beam and the first surface of the prism.

The collimating mirrors employed in the present invention are either spherical or an off-axis parabola.

Figure 3:
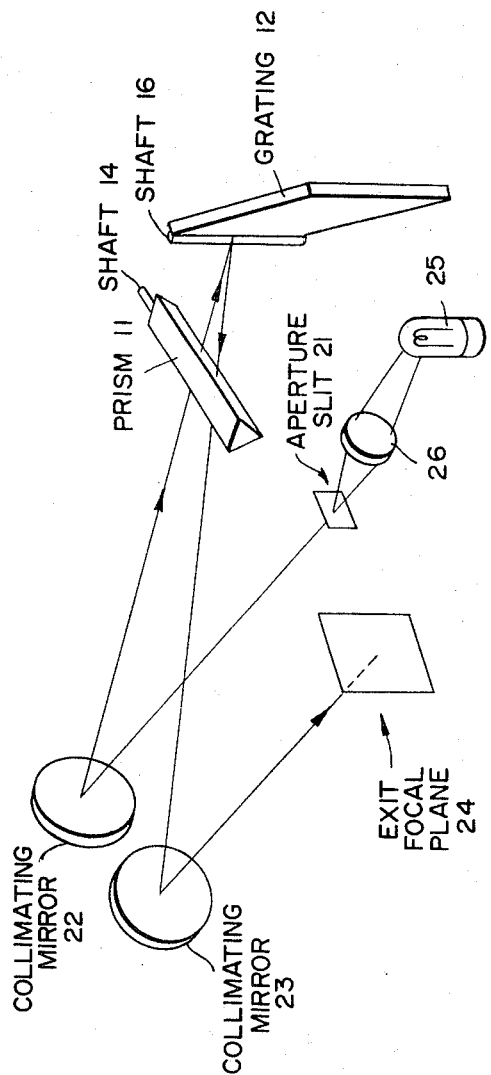
FIG. 3 is an illustration in diagrammatic form of the spectrometer of the present invention.

In FIG. 3 there is illustrated in diagrammatic form the complete spectrometer of the present invention. Energy from source 25 is focused by optics 26 on aperture slot 21. The energy passing through aperture 21 is incident on collimating mirror 22 which directs it on to a prism 11 which disperses the energy which is then incident on echelle grating 12. Prism 11 rotates about shaft 14 while grating 12 rotates about shaft 16 and shaft 15 (not shown). The dispersed energy reflected from the groove faces in grating 12 is returned through prism 11 to collimating mirror 23 from whence it is focused at the exit focal plane 24.

In the above drawings the orientation of the grating is selected to return the energy directly from the grating to the output collimator by passing it through the prism for a second time. In an alternative configuration the orientation of the grating is such that the energy reflected from the grating is directed to the collimator without a second pass through the prism. This alternative embodiment is desirable in applications where stray energy introduced by scatter from the incident beam of energy by the first surface of the prism is undesirable.

The novel spectrometer of the present invention, by reason of the arrangement of the prism and the grating with respect to each other, provides an essentially square focal plane for at least one spectral octave. This yields, simultaneously, higher resolution and a broader spectral range with desirable properties in that only a small range of angles with respect to the central ray of the focal point is produced.

The novel spectrometer of the present invention has a focal plane configuration which is particularly suited to the use of two dimensional electrooptical sensor methods. As examples of suitable sensors which may be employed in conjunction with the novel spectrometer of the present invention mention may be made of detector arrays, image tubes, image intensifiers, image convertors, spatial/temporal encoders and optical correlators.

Conventional methods for quantitating the output of a spectrometer either utilize photographic film as an intermediate storage media with subsequent quantitative densitometry of the film record or employ one or more photoelectronic sensors to produce an electrical output corresponding to the particular wavelength incident upon that sensor. The configuration of the focal plane of conventional spectrometers does not permit the use of two-dimensional electrooptical devices such as image tubes conveniently. A major advantage of the type of display produced by the novel echelle spectrometer of the present invention is that the two-dimensional nature of the display combined with the resolution scaling introduced by successive orders permits the use of two dimensional electrooptical quantitative sensors. An additional advantage of this type of spectrometer of the present invention is that a relatively small range of angles of the beams is involved in forming the focal plane image; hence it is relatively simple to recollect the energy following the initial spectral focal plane and perform additional reimaging. This latter advantage is particularly useful in situations where it is desirable to modify the spectral data prior to electrooptical detection. In cases where it is known that a wide dynamic range of spectral components exists, appropriate filtering can be introduced at the first spectral focal plane to compensate for the dynamic range and avoid local saturation of the detector and equalize the intensity of the spectral lines of interest so that a sensor having limited dynamic range, such as an image tube, can be employed.

An alternative embodiment is to introduce into the first spectral focal plane a spatial/temporal encoder and then collect the transmitted energy on a single detector. This technique provides a unique time sequence code corresponding to each resolution element in the spectral focal plane. The corresponding intensity may be decoded from the output of the single detector by utilizing temporal autocorrelation. In the event that only a small portion of the spectral data is desired, multiple reimaging can be utilized with a stationary transmission mask in the first spectral focal plane followed by reimaging into a second spectral focal plane where the spatial/temporal encoder is located.

Figure 4:
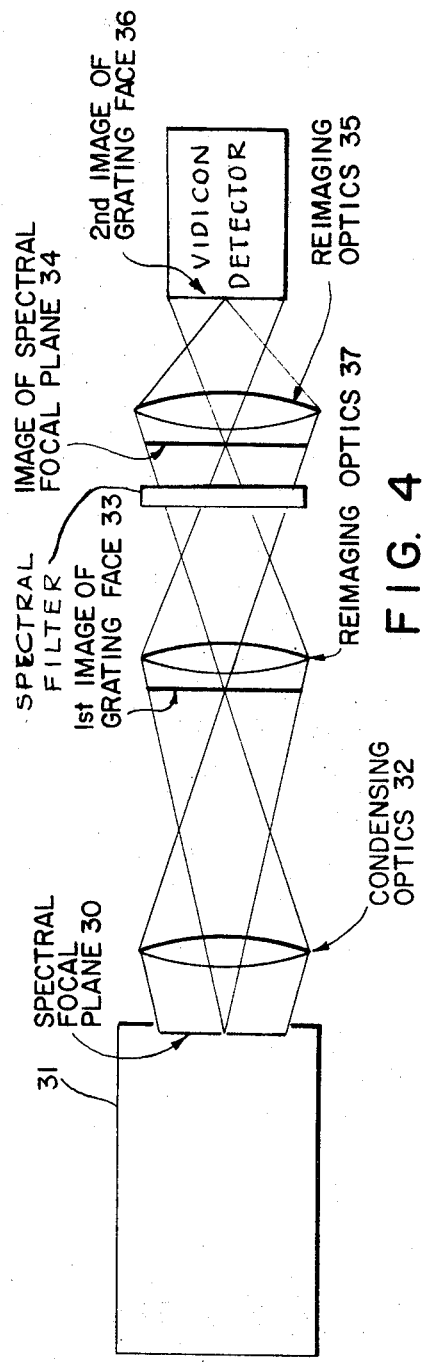
FIG. 4 is an illustration in diagrammatic form of an optical system for use with the spectrometer of the present invention for forming an image of the grating surface.

Referring now to FIG. 4, an example of the multiple reimaging is shown. The output energy from spectrometer 31 through spectral focal plane 30 passes through condensing optics 32 to provide a first image 33 of the grating face. The emitted beam then passes through reimaging optics 37 to provide a second image 34 of the spectral focal plane and thence to reimaging optics 35 which provides a second image 36 of the grating face. Optionally a spatial encoding disc or other type of encoder or an image tube may be employed at the spectral focal plane 36 or at a subsequent image of the spectral focal plane 34.

The multiple line, essentially square focal plane geometry provided by the echelle spectrometer of the present invention also permits useage of two dimensional electrooptical devices such as image intensifiers and image converters in addition to conventional image transducers such as vidicon or image orthicon. These devices may be used to enhance the sensitivity of the system or to extend the spectral range of the image tube.

Two dimensional incoherent optical filtering methods, i.e., an optical correlator, may also be used with the type of display generated by the spectrometer of the present invention. Optical correlation utilizing many spectral lines per element provides enhanced sensitivity over conventional techniques which employ only one spectral line per element.

The basic capability of the spectrometer to observe and detect a broad range of the spectrum at high resolution is useful whether the energy being analyzed is due to emission by a material or due to absorption by the material from a known source. Particular instrument configurations may be suited by specific problems but the basic advantages of this instrument approach are the two dimensional nature of the focal plane and the resolution scaling introduced as various orders are observed.

A suitable echelle grating for use in the present invention is comprised of 73.25 lines per millimeter, with a groove face blaze angle of approximately 63°. A 30°–60°–90° prism of calcium fluoride provides the necessary order separation and broad spectral coverage. Focal lengths and slit sizes are selected based on the particular instrument configuration and the purpose for which the instrument is to be employed.

This dispersing system may be combined for example, with 1 meter focal length optics to yield an instrument having reciprocal dispersion of 1.4 angstroms per mm at a wavelength of approximately 5000 A or 0.7 a/mm. at 2500 A, and covering the spectral range from 1500 A to 6000 A on a single 4 × 5 plate in the focal plane. Resolution is approximately 0.03 A at 2500 A with a 50 micron slit width.

For use with an image tube such as a vidicon, the focal length of the output collimator is preferably reduced to approximately 125 mm. This yields a reciprocal dispersion of 11.2 A/mm or a resolution of approximately 0.5 A with a conventional vidicon.

A very compact system compatible with packaging for an electronics rack is obtained with 0.5 meter focal length optics. The reciprocal dispersion is comparable to that obtained with a conventional 3 meter instrument (2.8 A per mm) yet it occupies less than a foot of vertical space, and less than 2 feet of depth. Resolution is approximately 0.1 angstroms at 5000 A (limited by optical abberations).

Unlike prior art devices, the spectrometer of the present invention is capable of simultaneous coverage of a wavelength range exceeding a factor of 100 to 1 with an essentially constant ratio between spectral resolution and wavelength. It is also unique in that the range of dispersion angles remain small; hence it permits a compact equipment configuration. For example, in the near ultraviolet, results comparable to a 10 meter prior art device are obtainable with a 1 meter device of the present invention.

Having described my invention, what I now claim is:

1. A method of focusing spectral energy distribution which comprises:
   a. directing incident radiation from a source through an aperture;
   b. dispersing said radiation by passing said radiation through a prism face;
   c. receiving the dispersed radiation on an echelle grating;
   d. reflecting said radiation as horizontal and vertical components; and
   e. focusing the horizontal and vertical components of the radiation at an exit focal plane by:
      i. rotating the grating about a first axis, said first axis substantially parallel to the prism face; and
      ii. rotating the grating about a second axis, said second axis substantially normal to the first axis and parallel to the grating rulings.

2. The method of claim 1 which includes receiving the radiation from the aperture on a collimating mirror and subsequently reflecting said radiation prior to dispersing said radiation.

3. The method of claim 1 which includes dispersing the horizontal and vertical components from the grating and subsequently focusing said horizontal and vertical components at the exit focal plane.

4. The method of claim 3 which includes receiving the horizontal and vertical components on a collimating mirror and subsequently focusing said components at the exit focal plane.

5. The method of claim 1 which includes forming a multiplicity of focal planes.

6. The method of claim 1 which includes detecting the radiation in said exit focal plane.

7. A method for focusing spectral energy distribution which comprises:
   a. directing incident radiation from a source through an aperture;
   b. receiving the radiation from the aperture on a collimating mirror and subsequently reflecting said radiation;
   c. impinging the radiation on a prism face;
   d. dispersing said radiation by passing said radiation through the prism;
   e. receiving the dispersed radiation from the prism on an echelle grating;
   f. reflecting said radiation as horizontal and vertical components;
   g. varying the horizontal and vertical components of the radiation at an exit focal plane by:
      1. rotating the grating about a first axis, said first axis substantially parallel to the prism face; and
      2. rotating the grating about a second axis, said second axis substantially normal to the first axis and parallel to the grating rulings; and
   h. passing the horizontal and vertical components from the grating through the prism and subsequently focusing said horizontal and vertical components at the exit focal plane.

* * * * *